April 30, 1946.    R. R. BRADSHAW    2,399,592
METHOD OF MAKING MOLDED THERMOPLASTIC ARTICLE
Filed Sept. 9, 1943

INVENTOR.
Russell R. Bradshaw
BY
Griswold & Burdick
ATTORNEYS

Patented Apr. 30, 1946

2,399,592

UNITED STATES PATENT OFFICE 2,399,592

METHOD OF MAKING MOLDED THERMO-PLASTIC ARTICLES

Russell R. Bradshaw, Midland, Mich., assignor to The Dow Chemical Company, Midland, Mich., a corporation of Michigan Application September 9, 1943, Serial No. 501,699

2 Claims. (Cl. 18—55)

This invention relates to methods and machines for making molded articles.

In the conventional molding processes, such as extrusion and injection molding, wherein a thermoplastic substance is melted and caused to flow into a mold cavity, considerable difficulty is encountered when the finished article has thin-walled sections. Unless the mold is heated, the molten thermoplastic material, which is usually viscous in nature, will not flow satisfactorily into parts of the mold cavity where the walls are close together because it becomes chilled from its contact with the closely spaced walls and thickens or hardens. It may even solidify and prevent further flow of the plastic before the space has been filled. Although this difficulty may be overcome to some extent by using a heated mold, this is undesirable because a considerably longer cooling time is then necessary before the thermoplastic substance in the mold becomes cold enough to be self-supporting so that it may be removed from the mold without permanent distortion. These difficulties are of particular importance when it is attempted to manufacture articles which have a relatively large proportion of thin-walled sections, such as in the manufacture of thermoplastic collapsible tubes of the type used extensively for packaging cosmetic and dental creams and pastes, adhesives, ointments, greases, and the like. In such tubes it is frequently desirable to have relatively large sections of the wall as thin as a few thousandths of an inch or thinner. It is, furthermore, desirable that these thin-walled sections not only receive their full complement of the thermoplastic molding substance, but that the surface of the molded section reproduces faithfully the mold surface. This is possible only when there is a free flow of the substance under full pressure to all portions of the mold surface. This is difficult to attain for the reasons pointed out previously and molded collapsible tubes have not been used commercially on a wide scale largely because of the lack of a satisfactory method whereby they may be molded easily.

It is, therefore, an object of the present invention to provide a method for molding a thermoplastic substance whereby molded articles having thin-walled sections may be produced readily.

An additional object is to provide a method for molding a thermoplastic article having a thin-walled section wherein the thin-walled section reproduces the mold surface faithfully.

An additional object is to provide a method for molding a thermoplastic collapsible tube.

These and related objects are accomplished readily by placing a charge of a molding preparation in a mold cavity in a die block, advancing a mandrel into the cavity and, while pressing the mandrel onto the molding charge, rotating the mandrel relative to the die block to generate frictional heat between the mandrel and the molding charge. Due to the heat generated by the friction, the molding charge is softened or melted and flows, under continued pressure of the mandrel, between the walls of the mandrel and the die cavity. Such flow into narrow spaces between the cavity wall and the mandrel is facilitated by the rapid motion of the surface of the rotating mandrel relative to the cavity wall, which motion, together with the pressure exerted on the plastic by the mandrel, carries the plastic readily into narrow spaces such as it has not heretofore been possible to fill completely by the usual molding processes even when high pressures were used. The plastic is maintained in the molten state during the period of flow because, should it cool sufficiently to thicken, the friction at the point of thickening and the heat developed thereby increases automatically.

The size of the molding charge is regulated so as to fill to the desired degree the space between the wall of the mold cavity and the mandrel when the latter has been advanced to a predetermined position. When the mandrel has advanced to such predetermined position, its advancement and rotation are stopped. After the rotation and advancement of the mandrel have been stopped, the molten plastic is quickly chilled by the cooling effect of the mandrel and the die block and soon hardens enough to be self-supporting. It may then be removed from the mold and subjected to a finishing operation, if desired, such as the trimming away of irregular or rough edges, the punching of holes at desired points and other obvious operations.

The mold may be constructed of any suitable material, but will usually be of metal. The metal used will, of course, depend to some extent on the particular thermoplastic substance to be molded, since it is well known that a thermoplastic substance usually adheres more tenaceously to molds made of certain metals than to molds made of certain other metals or alloys. Mold coatings known to the art may, if desired, be used to facilitate removal of the molded article from the mold. Although the invention is herein described with respect to a rotating mandrel, it is apparent that instead of rotating the mandrel the die block may be rotated or, if desired, both the die block and the mandrel may be rotated, preferably in opposite directions. The speed of rotation of the mandrel may vary widely, e. g. from less than 500 to more than 2500 revolutions per minute, depending upon its diameter, the pressure it exerts on the plastic, the nature of the plastic, and other factors. Minor irregularities, such as threads, shallow designs, and the like, in the surface of the die cavity are reproduced faithfully in the surface of the molded article. A split die block or mandrel may be used to facilitate removal of the molded article from the mold.

The invention is particularly adapted to the manufacture of an article whose cross-section in a plane perpendicular to the axis of rotation of the mandrel is substantially circular. Such articles may be cylindrical or cupped and of such shape that the molded article may be freed from the mold by first removing the die block to leave the outer surface of the article exposed and then stripping or sliding the article from the mandrel.

Reference is made to the accompanying drawing in which, in the interest of clarity, certain features are shown on a somewhat exaggerated scale.

Figures 1, 2:
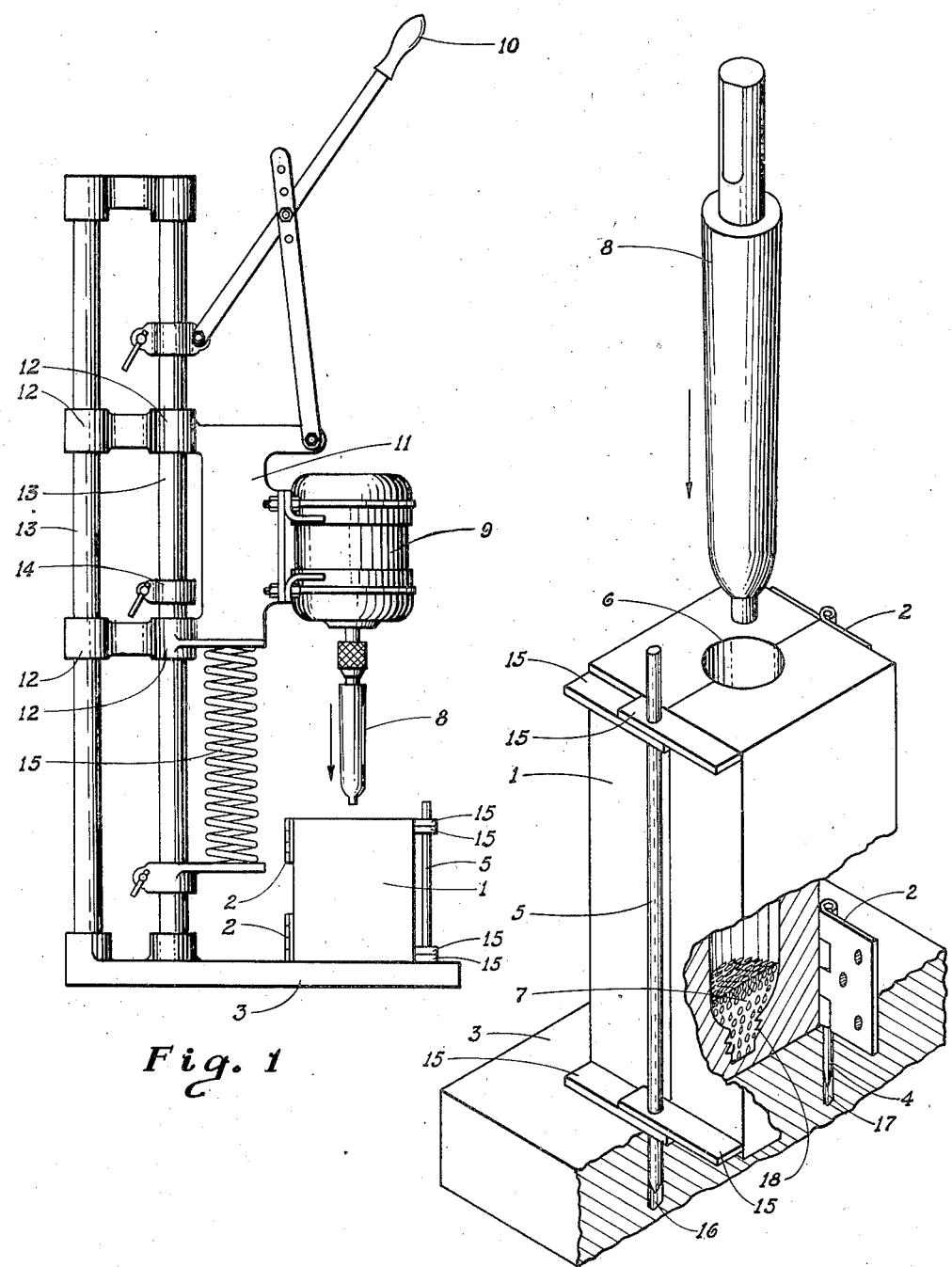
Fig. 1 is a side elevation of a machine adapted to mold thermoplastic articles having thin-walled sections.
Fig. 2 is an enlarged view partly in section of the die block and mandrel of Fig. 1.

Referring to Fig. 2, a split die block 1, the halves of which are hinged together as by hinges 2, is secured to a base 3 as by a lock rod 5 and an extension of the hinge bolt 4, both of which project into appropriate wells 16 and 17 in the base 3. The lock rod 5 also passes through holes in flanges 15 which are bolted or welded to the two halves of the die block and thus effectively locks the block in position to be charged with molding material. The block contains a die cavity 6 into which is charged a predetermined amount of a powdered or granular thermoplastic substance 7. A mandrel 8 is provided which, as shown in Fig. 1, may be rotated as by a motor 9 and which may be advanced into or withdrawn from the die cavity 6 by the operation of a lever 10. The mandrel is advanced into the die cavity and, while being rotated, is pressed firmly upon the plastic substance. Due to the frictional heat developed between the rotating mandrel and the plastic substance, the latter is softened or melted and, due to the rapid movement of the surface of the mandrel relative to the cavity wall, the molten plastic is forced easily by continued pressure of the mandrel into all portions of the space between the mandrel and the cavity wall. Threads, such as are shown at 18 of Fig. 2, may be formed in the molded article by the use of appropriately shaped dies. The rotating mandrel is maintained accurately centered with respect to the die cavity by means of proper guides. Thus, the motor support 11 of Fig. 1 may be provided with accurately ground sleeves 12 which slide along posts 13 which are in turn secured to the base 3. An adjustable stop 14 for the motor support 11 may be provided on one of the posts 13 whereby the advancement of the rotating mandrel into the die cavity beyond a predetermined position is prevented.

When the mandrel has reached such predetermined position and the space between the mandrel and the cavity wall is filled to the desired degree with the molten plastic, the rotation of the mandrel is stopped. After a few seconds the molten plastic becomes chilled sufficiently by the cooling effect of the mass of metal in the mandrel and in the die block to cause it to set and to be self-supporting. The lock rod 5 is then removed and the two halves of the mold swung apart. The molded thermoplastic article remains as a molded covering on the mandrel 8. The mandrel may then be returned to its original position by means of the lever 10, such return being facilitated by the action of the balancing spring 15, and the molded thermoplastic article may be stripped easily from the mandrel. The mold may then be closed and the lock rod 5 inserted ready for a subsequent molding operation.

The molded thermoplastic article may be trimmed or subjected to other desired finishing operations. For example, the collapsible tube prepared as herein described may be trimmed to the desired length and the threaded end cut to provide an opening through which the material packaged in the tube may be ejected.

Although the machine of the invention has been described with respect to hand operation, it is apparent that automatically operated machines may be used without departing from the spirit of the invention. Also, it is obvious that molded thermoplastic articles, other than collapsible tubes, having thin-walled sections may be made by using a suitably shaped mandrel and a die block with a suitable die cavity. The method and machines of the invention are particularly adapted to the molding of articles having wall thicknesses of from about 0.25 inch to as thin as one or two thousandths of an inch. However, articles having walls thicker or thinner than those mentioned may be molded, if desired. The invention, furthermore, contemplates the molding of thermosetting plastics to form articles which may become sufficiently thermoset in the mold to be self-supporting and which may, after removal from the mold, be heated to complete the thermosetting process. The temperature of the mold may, in certain instances, be controlled. For plastics having high melting or softening points it may be desirable to warm the mold somewhat to reduce to some extent the heat necessary to be generated frictionally. In other cases the mold may become heated through continued use, and cooling may be desirable. In any case the mold temperature should be below the softening temperature of the plastic substance being molded so that chilling of the formed article will proceed rapidly when the rotation of the mandrel is stopped.

I claim:

1. The method of making a molded thermoplastic hollow article having thin-walled sections, which includes: placing a molding charge of small particles of an organic thermoplastic in a wide-mouthed die cavity; advancing into the cavity through said mouth a mandrel of circular cross-section slightly smaller than that of said cavity; rotating the advancing mandrel in pressure contact with the molding charge and out of contact with the walls of the die, at a rate sufficient to melt the thermoplastic particles; stopping the advancement of the mandrel at a predetermined position; continuing the said rotation until the softened plastic has filled the space between the die and the mandrel, and then stopping rotation of the mandrel; and, after the molded article has cooled sufficiently to become self-supporting, removing it from the mold.

2. The method of making a thin-walled organic thermoplastic collapsible tube for dispensing creams, pastes and the like, which comprises: providing a full-opening hollow die, the internal chamber of which has the dimensions and contour of the outer surface of the desired collapsible tube; placing in the said cavity a molding charge, sufficient to form the desired tube, of small particles of an organic thermoplastic; providing a rotatable mandrel of circular cross-section, the outer dimensions and contour of which are those of the desired inner surfaces of the collapsible tube; positioning said mandrel coaxially with the die cavity; rotating the mandrel and advancing it into pressure contact with the molding charge at a rate of rotation sufficient to melt the thermoplastic particles; stopping the advancement of the mandrel at a predetermined distance from the end of the die cavity; continuing the rotation of the mandrel until the softened plastic has filled the space between the die and the mandrel, and then stopping rotation of the mandrel; allowing the molded tube to cool sufficiently to become self-supporting; separating the die and mandrel and removing the thermoplastic tube; and, trimming the tube to desired length and cutting an opening in the dispensing end thereof.

RUSSELL R. BRADSHAW.